US012459141B2

(12) United States Patent
Liao et al.

(10) Patent No.: US 12,459,141 B2
(45) Date of Patent: Nov. 4, 2025

(54) CABLE TIE REMOVAL TOOL

(71) Applicant: Hanlong Industrial Co., Ltd., New Taipei (TW)

(72) Inventors: Chien-Chou Liao, New Taipei (TW); Hsiu-Ru Lu, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 256 days.

(21) Appl. No.: 17/839,611

(22) Filed: Jun. 14, 2022

(65) Prior Publication Data

US 2023/0219245 A1 Jul. 13, 2023

(30) Foreign Application Priority Data

Jan. 13, 2022 (TW) ................................ 111200514

(51) Int. Cl.
*B26B 17/00* (2006.01)

(52) U.S. Cl.
CPC ............ *B26B 17/006* (2013.01); *B26B 17/00* (2013.01)

(58) Field of Classification Search
CPC ....... B26B 17/00; B26B 17/006; B26B 17/02; B26B 13/06; B26B 13/08; B26B 13/10; B26B 13/22
USPC .......................................... 30/175, 178, 193
See application file for complete search history.

(56) References Cited

U.S. PATENT DOCUMENTS 444,764 A * 1/1891 Nessle .................... B26B 17/00 30/186
1,107,210 A * 8/1914 Adams ................. H02G 1/1275 81/9.4
1,578,438 A * 3/1926 Hintz .................... B26B 17/006 30/186
1,579,128 A * 3/1926 Mizell ..................... B26B 17/00 86/22
1,621,576 A * 3/1927 Besancon ............... B25B 27/08 29/248
1,623,689 A * 4/1927 Lind ....................... B26B 17/00 269/259
2,202,340 A * 5/1940 Faist ..................... B26B 17/006 30/193

(Continued)

FOREIGN PATENT DOCUMENTS

CA 2476348 A1 * 2/2006 ............. B26B 17/00
DE 9105152 U1 * 11/1991 ............. B26B 17/02

(Continued)

*Primary Examiner* — Jason Daniel Prone
(74) *Attorney, Agent, or Firm* — Best & Flanagan LLP

(57) ABSTRACT

A cable tie removal tool includes a first jaw, a first cutting member, a second jaw, and a second cutting member. The first cutting member is connected to the first jaw. The first cutting member and the first jaw have a first included angle formed therebetween. The first cutting member includes a first cutting edge and a first convex portion. The first convex portion is disposed at one end of the first cutting edge close to the first jaw. The second cutting member is connected to the second jaw and is located at one end of the second jaw. The second cutting member and the second jaw have a second included angle formed therebetween. The second cutting member includes a second cutting edge, and the second cutting edge and the first cutting edge are disposed adjacent to each other in a fully closed state.

6 Claims, 12 Drawing Sheets

(56) References Cited

U.S. PATENT DOCUMENTS

| | | | | | |
|---|---|---|---|---|---|
| 2,239,852 | A * | 4/1941 | Lind | B26B 17/02 | 30/193 |
| 2,308,684 | A * | 1/1943 | Geddes | B26B 17/02 | 30/193 |
| 2,814,869 | A * | 12/1957 | Matson | B26B 17/00 | 30/124 |
| 4,141,141 | A * | 2/1979 | ViPond | B26B 17/00 | 30/186 |
| 4,229,881 | A * | 10/1980 | Troxel | B26B 13/06 | 30/254 |
| 5,101,566 | A * | 4/1992 | Crapo | B26B 17/02 | 30/358 |
| D337,247 | S * | 7/1993 | Dart | D8/52 | |
| 5,797,922 | A * | 8/1998 | Hessel | A61B 17/128 | 606/120 |
| 5,997,548 | A * | 12/1999 | Jahanger | A61B 17/122 | 606/120 |
| 6,305,086 | B1 * | 10/2001 | Burgholzer | B26B 17/006 | 30/186 |
| 8,365,418 | B2 * | 2/2013 | Tomasetti | B26B 17/00 | 30/286 |
| D825,713 | S * | 8/2018 | Kim | D22/149 | |
| 10,584,870 | B2 * | 3/2020 | White | B26B 17/006 | |
| 10,668,544 | B2 * | 6/2020 | Rodriquez | B26B 17/02 | |
| 11,407,131 | B2 * | 8/2022 | Bader | B26B 17/02 | |
| 11,833,649 | B2 * | 12/2023 | Schleiminger | B26B 17/00 | |
| 2005/0097758 | A1 * | 5/2005 | Elkins | B26B 17/00 | 30/233 |
| 2006/0075642 | A1 * | 4/2006 | Elkins | B26B 17/00 | 30/233 |
| 2006/0168820 | A1 * | 8/2006 | Chen | B26B 17/006 | 30/175 |
| 2007/0240316 | A1 * | 10/2007 | Yu | B26B 13/06 | 30/254 |
| 2008/0178707 | A1 * | 7/2008 | Stevens | B26B 17/00 | 81/9.43 |
| 2010/0126025 | A1 * | 5/2010 | Crockett | B26B 17/00 | 30/188 |
| 2019/0299431 | A1 * | 10/2019 | Montgomery | B26B 17/00 | |

FOREIGN PATENT DOCUMENTS

| | | | | |
|---|---|---|---|---|
| FR | 389859 | A * | 9/1908 | B26B 17/02 |
| FR | 491670 | A * | 6/1919 | B26B 17/02 |
| GB | 190817688 | A * | 8/1909 | B26B 17/02 |
| GB | 191513202 | A * | 12/1916 | B26B 17/02 |
| GB | 738298 | A * | 10/1955 | B26B 17/00 |
| GB | 986023 | A * | 3/1965 | B26B 17/00 |
| KR | 20120108810 | A * | 10/2012 | B26B 17/006 |
| TW | M498095 | U * | 4/2015 | H02G 1/005 |
| TW | M628148 | U * | 6/2022 | B26B 17/006 |
| WO | WO-2017216451 | A1 * | 12/2017 | B26B 17/00 |
| WO | WO-2019155726 | A1 * | 8/2019 | B26B 17/00 |

* cited by examiner

CABLE TIE REMOVAL TOOL

BACKGROUND

1. Technical Field

The present disclosure relates to a removal tool, and more particularly, to a cable tie removal tool.

2. Description of the Related Art

A cable tie can bundle multiple objects all at once, so it is often used in storage and packaging applications. For example, cable ties can be used to bundle several electrical wires, or network cables, or multiple boxes. Cable ties are usually made of plastic. When removing a cable tie, a blade or a special cable tie removal tool is often used, as shown in FIG. 1. FIG. 1 illustrates a schematic diagram of a conventional cable tie removal tool.

The main structure of a cable tie 8 includes a band 81 and a head 82. One side of the band 81 has a tooth-like structure. The head 82 is located at one end of the band 81, and the head 82 has a through hole for the band 81, with a ratchet being disposed therein (a one-way gripping structure). Therefore, when bundling wires such as wire 7 with cable tie 8, first the band 81 is wound around the wire 7, and then one end of the band 81 (without head 82) is passed through the through hole of the head 82. When the wire 7 is bundled by the band 81, the ratchet in the through hole can be engaged with the tooth-like structure on the band 81 to prevent the band 81 from loosening, thereby achieving the function of bundling and packaging.

A conventional cable tie removal tool (hereinafter referred to as the removal tool 9) has a structure similar to that of a plier, and has a sharp front end, and cutting edges 91 parallel to the direction of the long axis of the removal tool 9. Therefore, when removing the cable tie 8, the long axis direction of the removal tool 9 must be perpendicular to the band 81, so that the cutting edges 91 can be placed on different sides of the band 81 respectively, thereby allowing the removal tool 9 to cut the band 81. However, the sharp front end of the removal tool 9 could damage the wire 7 or other bundled objects during such an operation, so it is necessary to provide an improved cable tie removal tool.

SUMMARY

In view of the above-mentioned problems, it is a main object of the present disclosure to provide a cable tie removal tool, which can solve the problem that the conventional cable tie removal tool could easily damage the bundled object during operation by providing a novel structure of (first, second) cutting members.

To achieve the abovementioned objects, the present disclosure provides a cable tie removal tool comprising a first jaw, a first cutting member, a second jaw, and a second cutting member. The first cutting member is connected to the first jaw and located at one end of the first jaw. The first cutting member and the first jaw have a first included angle formed therebetween. The first cutting member comprises a first cutting edge and a first convex portion. The first cutting edge is located at one side of the first cutting member; and a first convex portion is disposed at one end of the first cutting edge close to the first jaw. The second jaw and the first jaw are pivotally connected to each other. The second cutting member is connected to the second jaw and located at one end of the second jaw. The second cutting member and the second jaw have a second included angle formed therebetween. The second cutting member comprises: a second cutting edge located at one side of the second cutting member, and the second cutting edge and the first cutting edge are disposed adjacent to each other in a fully closed state.

According to an embodiment of the present disclosure, the first included angle and the second included angle are respectively 90 degrees.

According to an embodiment of the present disclosure, the first convex portion protrudes from the first cutting member toward the direction of the second cutting member.

According to an embodiment of the present disclosure, the first cutting member and the second cutting member are aligned with each other in the fully closed state.

According to an embodiment of the present disclosure, the first cutting member and the second cutting member contact with each other in the fully closed state.

According to an embodiment of the present disclosure, the first convex portion is located on a bottom side of the second cutting member in the fully closed state.

According to an embodiment of the present disclosure, the first cutting member is disposed on an inner side of the second cutting member in the fully closed state.

According to an embodiment of the present disclosure, the first cutting edge is disposed on an inner side of the second cutting edge in the fully closed state.

According to an embodiment of the present disclosure, the second cutting member further comprises a second convex portion disposed at one end of the second cutting edge close to the second jaw. Furthermore, the second convex portion protrudes from the second cutting member toward the direction of the first cutting member.

According to an embodiment of the present disclosure, the first cutting member is connected to a front end of the first jaw, and the second cutting member is connected to a front end of the second jaw.

According to an embodiment of the present disclosure, the first cutting member is connected to a side of the first jaw, and the second cutting member is connected to a side of the second jaw.

According to an embodiment of the present disclosure, the first cutting member comprises a first portion and a second portion. The first portion is connected to the side of the first jaw. The second portion is parallel to a front end of the first jaw, and the first cutting edge is located at the second portion. The second cutting member comprises a third portion and a fourth portion. The third portion is connected to the side of the second jaw, the fourth portion is parallel to a front end of the second jaw, and the second cutting edge is at the fourth portion.

According to an embodiment of the present disclosure, the first jaw further comprises a first arc blade located on the side facing the second jaw. The second jaw further comprises a second arc blade located on the side facing the first jaw.

According to an embodiment of the present disclosure, a front side surface of the first cutting member and a front side surface of the second cutting member are respectively a plane.

According to an embodiment of the present disclosure, the cable tie removal tool further comprises a first handle and a second handle. The first handle is connected to the first jaw and located at one end opposite to the first cutting member. The second handle is connected to the second jaw and located at one end opposite to the second cutting member.

As described above, a cable tie removal tool according to the present disclosure includes a first jaw, a first cutting member, a second jaw, and a second cutting member. The first cutting member is connected to the first jaw, and is located at one end of the first jaw. The second cutting member is connected to the second jaw, and is located at one end of the second jaw. One side of the first cutting member has a first cutting edge, and one side of the second cutting member has a second cutting edge. In the fully closed state, the second cutting edge and the first cutting edge are disposed adjacent to each other. Since the first cutting member and the first jaw have a (first) angle, and the second cutting member and the second jaw also have a (second) angle, the front end of the cable tie removal tool is formed to have a gentle (not sharp) configuration. When the first cutting member and the second cutting member at the front end of the cable tie removal tool are heading toward the cable tie to be removed, the bundled object will not be damaged. In addition, the first cutting member further includes a first convex portion, which is disposed at an end of the first cutting edge close to the first jaw. During operation, the first convex portion can lift the cable tie, so that the cable tie and the bundled object are slightly separated, thereby preventing the first cutting edge and the second cutting edge from being in contact with the bundled object to avoid damaging the object.

DETAILED DESCRIPTION OF THE EMBODIMENTS

In order to make the structure, characteristics, and effectiveness of the present disclosure further understood and recognized, a detailed description of the present disclosure is provided as follows, along with embodiments and accompanying figures.

Figure 2:
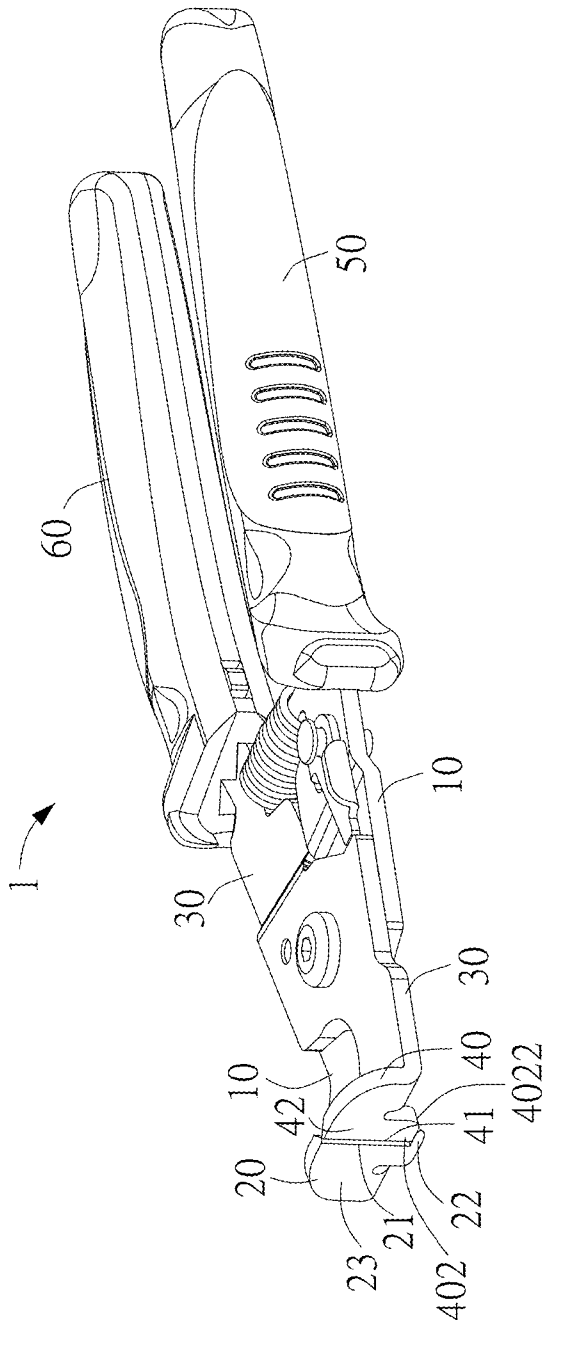
FIG. 2 illustrates a schematic view of a cable tie removal tool according to a first embodiment of the present disclosure.
Figure 3:
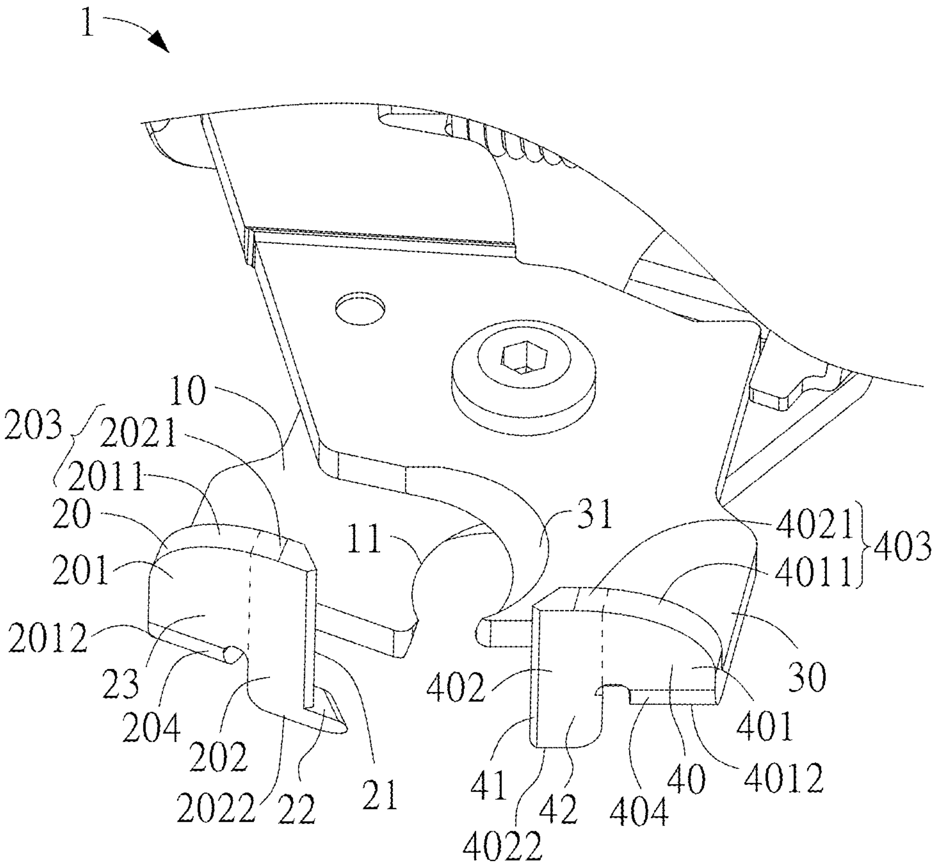
FIG. 3 illustrates a schematic view of a part of the cable tie removal tool shown in FIG. 2 in a fully open state.

FIG. 2 illustrates a schematic view of a cable tie removal tool according to a first embodiment of the present disclosure, FIG. 3 illustrates a schematic view of a part of the cable tie removal tool shown in FIG. 2 in a fully open state, please refer to FIG. 2 and FIG. 3. The cable tie removal tool 1 of this embodiment includes a first jaw 10, a first cutting member 20, a second jaw 30, and a second cutting member 40. The first cutting member 20 comprises a short portion 201, an elongated portion 202, a free end 203 and a connecting end 204. The short portion 201 is adjacent to the elongated portion 202. The short portion 201 has a first end 2011 and a second end 2012 opposite to each other, and the elongated portion 202 also has a first end 2021 and a second end 2022 opposite to each other; wherein a distance measured between the first end 2011 and the second end 2012 of the short portion 201 is shorter than a distance measured between the first end 2021 and the second end 2022 of the elongated portion 202. The free end 203 is formed by the first end 2011 of the short portion 201 and the first end 2012 of the elongated portion 202. The connecting end 204 is formed by the second end 2012 of the short portion 201. The second end 2022 of the elongated portion 202 extends toward the connecting end 204 and protrudes outwardly from the connecting end 204. The connecting end 204 of the first cutting member 20 is connected to the first jaw body first jaw 10 and is located at one end of the first jaw 10. Also, the second cutting member 40 comprises a short portion 401, an elongated portion 402, a free end 403 and a connecting end 404. The short portion 401 is adjacent to the elongated portion 402. The short portion 401 has a first end 4011 and a second end 4012 opposite to each other, and the elongated portion 402 also has a first end 4021 and a second end 4022 opposite to each other; wherein a distance measured between the first end 4011 and the second end 4012 of the short portion 401 is shorter than a distance measured between the first end 4021 and the second end 4022 of the elongated portion 402. The free end 403 is formed by the first end 4011 of the short portion 201 and the first end 4012 of the elongated portion 402. The connecting end 404 is formed by the second end 4012 of the short portion 401. The second end 4022 of the elongated portion 402 extends toward the connecting end 404 and protrudes outwardly from the connecting end 404. The second connecting end 404 of the second cutting member 40 is connected to the second jaw 30 and is located at one end of the second jaw 30. In this embodiment, the first cutting member 20 is located at the front end of the first jaw 10, and the second cutting member 40 is similarly located at the front end of the second jaw 30.

Besides, the second jaw 30 and the first jaw 10 are pivotally connected to each other, and are arranged in an X-shaped staggered arrangement, so that the cable tie removal tool 1 can be in a fully closed state (as shown in FIG. 2) or the fully open state (as shown in FIG. 3). Preferably, the cable tie removal tool 1 further includes a first handle 50 and a second handle 60. The first handle 50 is connected to the first jaw 10, and is located at an end opposite to the first cutting member 20. That is, the first handle 50 is connected to the rear end of the first jaw 10. The second handle 60 is connected to the second jaw 30, and is located at an end opposite to the second cutting member 40. That is, the second handle 60 is connected to the rear end of the second jaw 30. By holding and operating the first handle 50 and the second handle 60, a user can set up the cable tie removal tool 1 to be in a fully closed state or a fully open state, and then make the first cutting member 20 and the second cutting member 40 close to (in contact) or separated from each other. Preferably, the second handle 60 may have a curvature to facilitate the user's pressing operation.

In this embodiment, the first cutting member 20 and the first jaw 10 are both plates, and the first cutting member 20 and the first jaw 10 have a first included angle formed therebetween. In other words, the first cutting member 20 and the first jaw 10 are plates located at different levels, so that there is an (first) included angle between the first cutting member 20 and the first jaw 10. Preferably, the first jaw 10 and the first cutting member 20 are formed in one piece. For example, the first jaw 10 and the first cutting member 20 are formed by bending a plate, so that the first cutting member 20 is connected to the front end of the first jaw 10, and there is a first included angle between the first cutting member 20 and the first jaw 10. In other words, the first cutting member 20 is formed by extending upward from the front end of the first jaw 10.

Similarly, the second jaw 30 and the second cutting member 40 are both plates, and the second cutting member 40 and the second jaw 30 have a second included angle formed therebetween. That is, the second cutting member 40 and the second jaw 30 are plates located at different levels, so that there is a (second) included angle between the second cutting member 40 and the second jaw 30. Preferably, the first included angle and the second included angle are respectively 90 degrees. In other words, the first cutting member 20 is perpendicular to the first jaw 10, and the second cutting member 40 is perpendicular to the second jaw 30. The second cutting member 40 and the second jaw 30 are formed in one piece. For example, the second jaw 30 and the second cutting member 40 are formed by bending a plate, so that the second cutting member 40 is connected to the front end of the second jaw 30, and there is a second included angle between the second cutting member 40 and the second jaw 30. In other words, the second cutting member 40 is formed by extending upward from the front end of the second jaw 30.

As shown in FIG. 3, the first cutting member 20 includes a first cutting edge 21 and a first convex portion 22. The first cutting edge 21 is located on one side of the first cutting member 20 and is on the side facing the second cutting member 40. The first convex portion 22 is disposed at the end of the first cutting edge 21 close to the first jaw 10, that is, the first convex portion 22 is located at the bottom of the first cutting edge 21. Besides, the first convex portion 22 protrudes from the first cutting member 20 toward the direction of the second cutting member 40. In addition, the second cutting member 40 includes a second cutting edge 41. The second cutting edge 41 is located on one side of the second cutting member 40 and is on the side facing the first cutting member 20. Specifically, the first cutting edge 21 is located at a side of the elongated portion 202 that faces away from the short portion 201. The first convex portion 22 is disposed at the side of the elongated portion 202 that faces away from the short portion 201. The convex portion 22 and the free end 201 of the first cutting member 10 positioned at two opposite ends of the first cutting edge 21 of the first cutting member 20. Further, the second cutting edge 41 is located at a side of the elongated portion 402 that faces away from the short portion 401. In other words, the first cutting edge 21 is opposite to the second cutting edge 41, so that the second cutting edge 41 and the first cutting edge 21 can be disposed adjacent to each other in a fully closed state, as shown in FIG. 2. In this embodiment, in the fully closed state, the first cutting edge 21 and the second cutting edge 41 are in contact with each other. The first convex portion 22 protrudes from the first cutting member 20 toward the direction of the second cutting member 40 in the fully closed state. Further, the first convex portion 22 of the first cutting member 20 is located outside the second end 4022 of the elongated body 402 of the second cutting member 40 in the fully closed state, as shown in FIG. 2. In addition, because the first cutting edge 21 is located on the side of the first cutting member 20 facing the second cutting member 40, and the second cutting edge 41 is located on the side of the second cutting member facing the first cutting member 20, so that the first cutting edge 21 and the second cutting edge 41 are not parallel to the long axis direction of the cable tie removal tool 1.

Figure 4A:
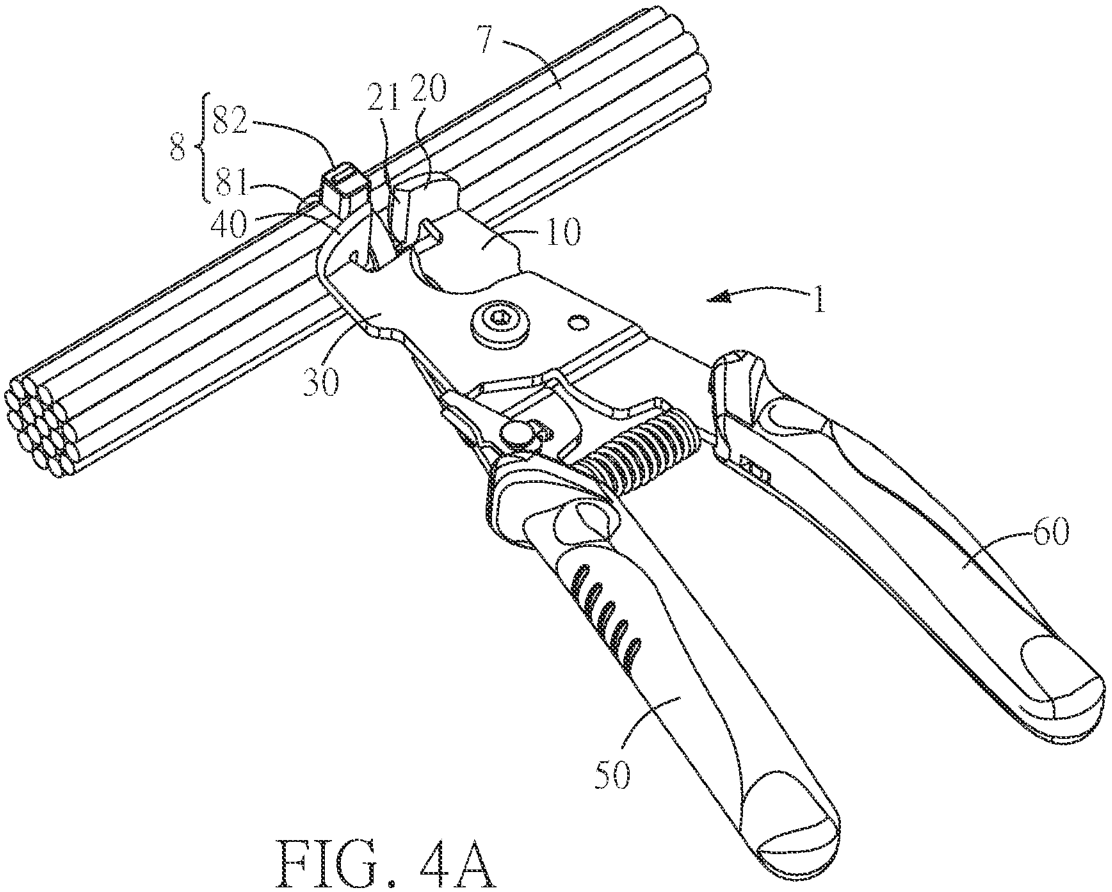
FIG. 4A illustrates a schematic view of the cable tie removal tool shown in FIG. 2 used for removing the cable tie.
Figure 4B:
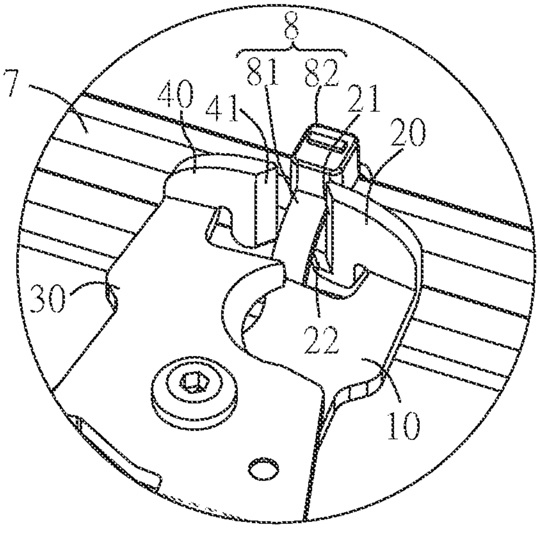
FIG. 4B illustrates a partially enlarged schematic view of the cable tie removal tool shown in FIG. 4A.

In this embodiment, the first cutting edge 21 and the second cutting edge 41 can be used to cut the band 81 of the cable tie 8, as shown in FIG. 4A and FIG. 4B. FIG. 4A illustrates a schematic view of the cable tie removal tool shown in FIG. 2 for removing the cable tie, and FIG. 4B is a partially enlarged schematic view of the cable tie removal tool shown in FIG. 4A. A user can hold the cable tie removal tool 1 of this embodiment, open the cable tie removal tool 1 (that is, in the fully open state), and then turn the first cutting member 20 and the second cutting member 40 at the front end to face the cable tie 8 to be removed. As shown in FIG. 4A and FIG. 4B, one of the removing methods is to insert the first convex portion 22 between the band 81 and the bundled object (for example, the wire 7). The band 81 is lifted up by the first convex portion 22 and is slightly separated from the wire 7, so that the first cutting edge 21 and the second cutting edge 41 can be located at the two sides of the band 81 respectively, thereby preventing the first cutting edge 21 and the second cutting edge 41 from being in contact with the wire 7 to avoid damaging the wire 7. Next, the cable tie removal tool 1 is closed, the first cutting edge 21 and the second cutting edge 41 are brought close to each other to cut the band 81 of the cable tie 8.

Figure 1:
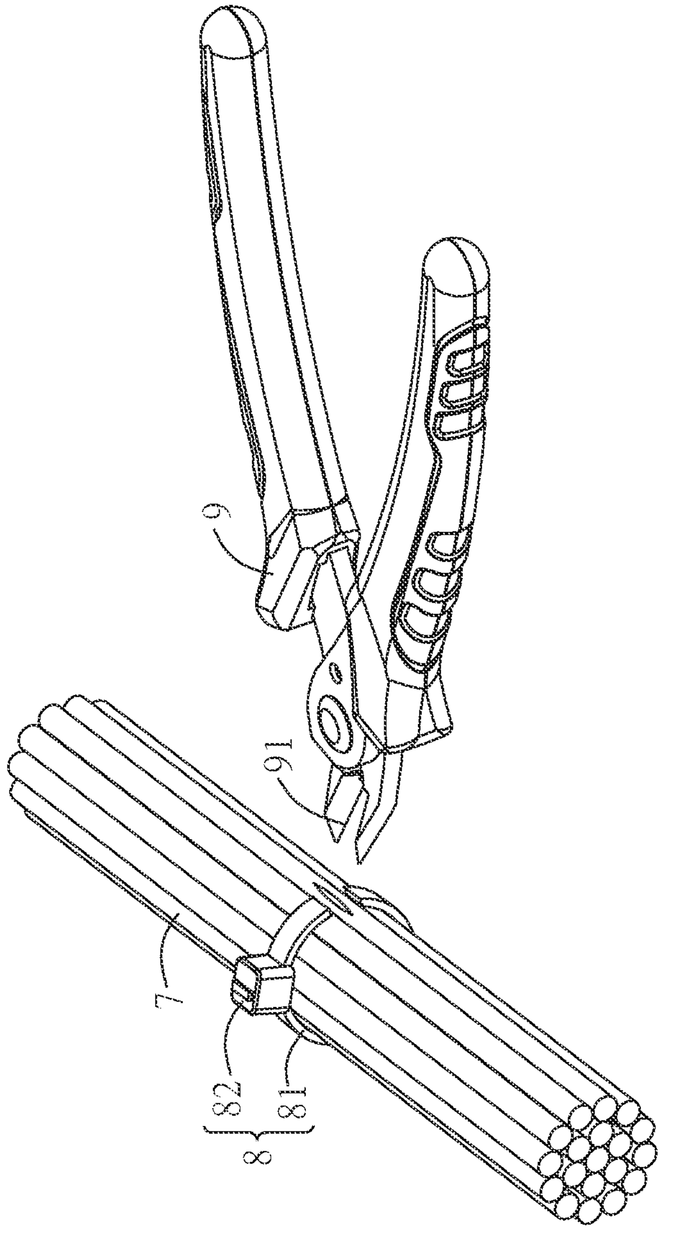
FIG. 1 (PRIOR ART)
FIG. 1 illustrates a schematic view of a conventional cable tie removal tool.

The front ends of the cable tie removal tool 1 of this embodiment are the first cutting member 20 and the second cutting member 40. There is a first included angle between the first cutting member 20 and the first jaw 10, and there is a second included angle between the second cutting member 40 and the second jaw 30, that is, the first cutting member 20 and the first jaw 10 are plates located at different levels, and the second cutting member 40 and the second jaw 30 are plates located at different levels. Therefore, the front end of the cable tie removal tool 1 has a gentle (non-sharp) structure. Hence, when the first cutting member 20 and the second cutting member 40 at the front end face the cable tie 8 to be removed, they will not cause the bundled object to (that is, the wire 7) to be damaged. In other words, the situation that the front end of the conventional removal tool 9 pierces the wire 7 can be avoided, as shown in FIG. 1. Preferably, the front side surface 23 of the first cutting member 20 and the front side surface 42 of the second cutting member 40 in this embodiment are respectively a plane. That is, the front side surface 23 of the first cutting member 20 and the front side surface 42 of the second cutting member 40 are both flat surfaces, which can avoid damaging the wire 7 during operation.

Figure 5:
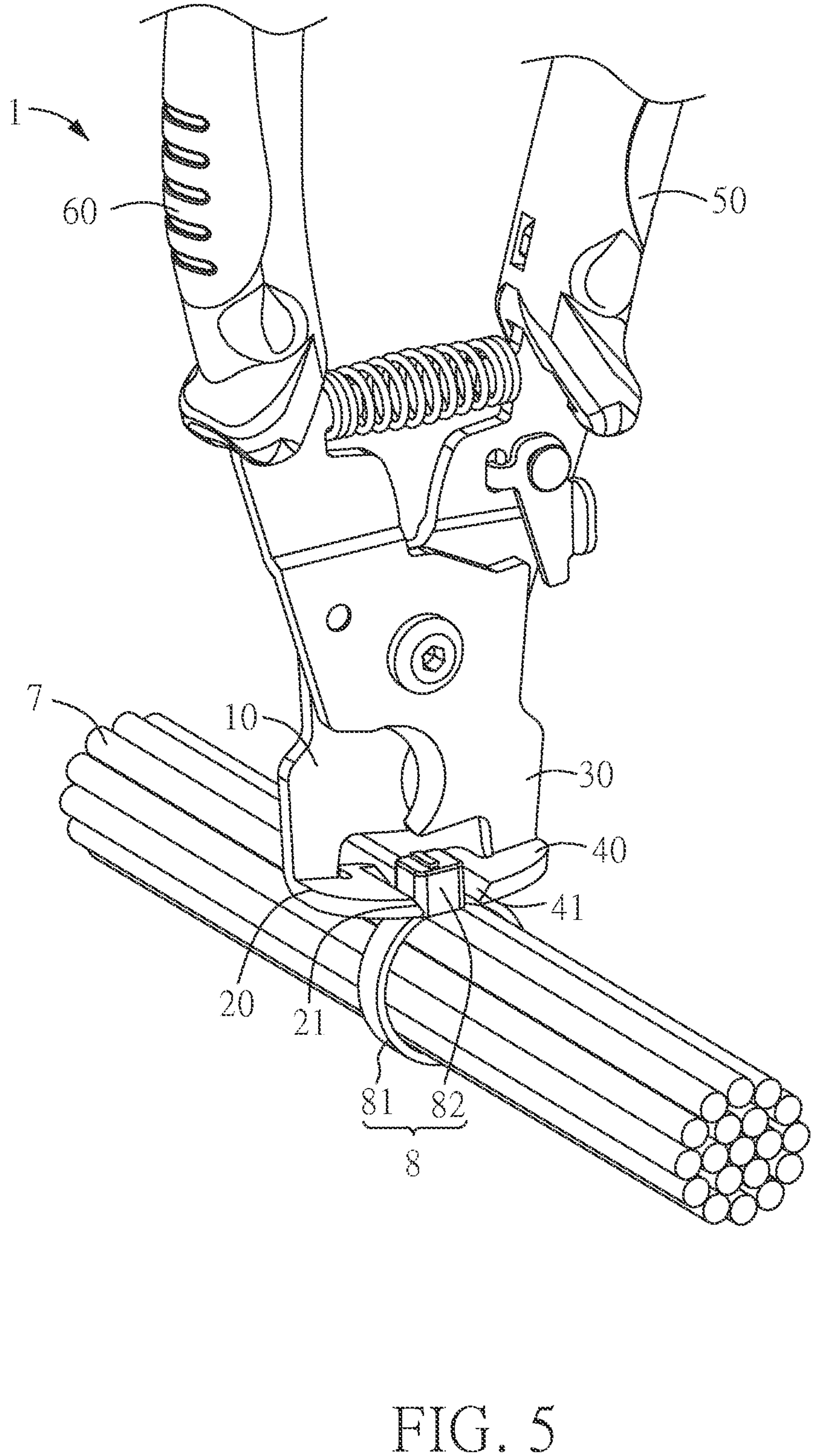
FIG. 5 and FIG. 6 illustrate schematic views of the cable tie removal tool shown in FIG. 2 used for removing the head of the cable tie.

FIG. 5 illustrates a schematic view of the cable tie removal tool shown in FIG. 2 for removing the head of the cable tie, please refer to FIG. 2 and FIG. 5. By using the structure that the first cutting member 20 is perpendicular to the first jaw 10, and the second cutting member 40 is perpendicular to the second jaw 30, the cable tie removal tool 1 of this embodiment is more applicable to remove the head of the cable tie. Specifically, after the cable tie removal tool 1 is opened (that is, in the fully open state), the first cutting member 20 and the second cutting member 40 are placed on the two sides of the bottom of the head 82. Next, the cable tie removal tool 1 is closed, the first cutting edge 21 and the second cutting edge 41 are brought close to each other, and then the band 81 (located on the bottom edge of head 82) connected to the head 82 can be cut. Alternatively, the cable tie removal tool 1 can also remove the cable tie 8 by removing the head 82 of the cable tie 8.

Preferably, when the cable tie removal tool 1 of this embodiment is in a fully closed state, the first cutting member 20 and the second cutting member 40 are aligned with each other, as shown in FIG. 2. In other words, the front side surface 23 of the first cutting member 20 and the front side surface 42 of the second cutting member 40 are aligned planes, so that the cable tie removal tool 1 of this embodiment is more suitable for removing the head 82 of the cable tie 8 with the first cutting edge 21 and the second cutting edge 41. Preferably, in the fully closed state, the first convex portion 22 is located on the bottom side of the second cutting member 40, so that the first convex portion 22 will not prevent the second cutting edge 41 from being in contact with the first cutting edge 21. Therefore, the cable tie removal tool 1 of this embodiment can use the first cutting edge 21 and the second cutting edge 41 to cut the band 81 or the head 82 of the cable tie 8 according to the requirements of the user, thereby achieving the effect of convenient operation.

Figure 6:
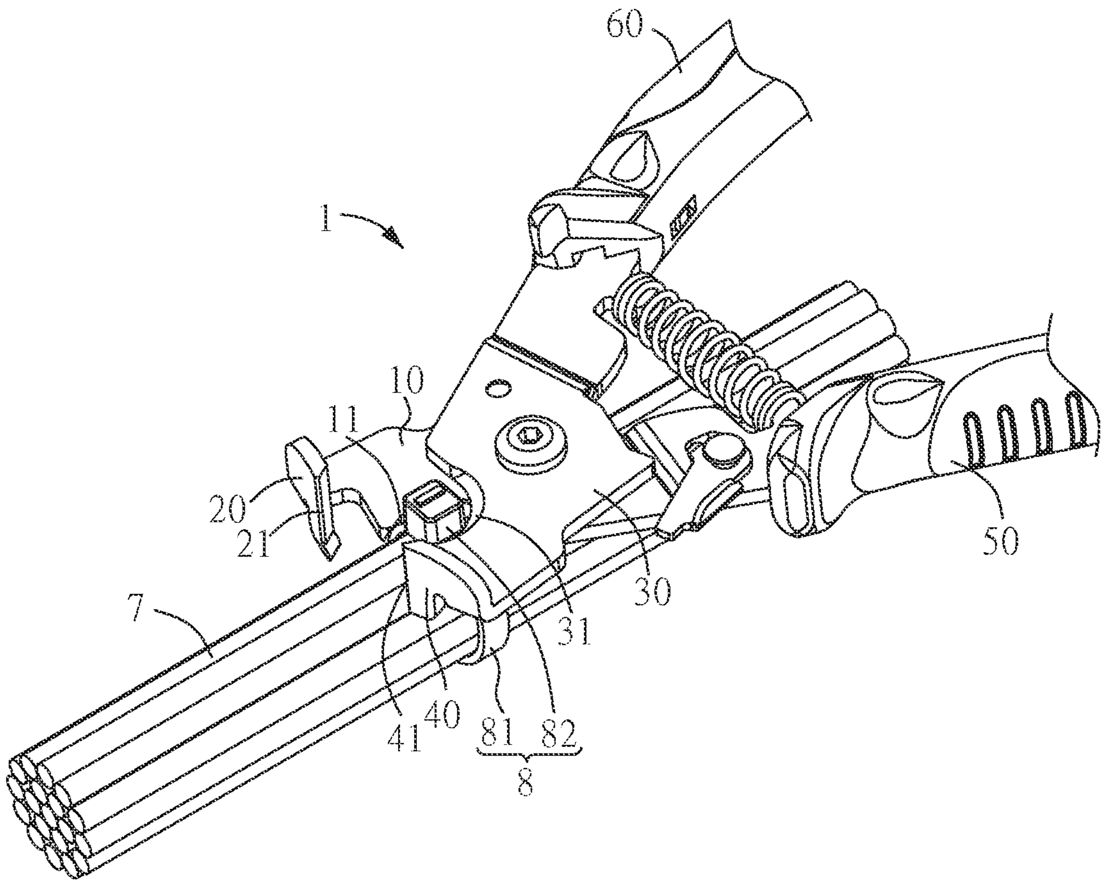

As shown in FIG. 3, the first jaw 10 of this embodiment further includes a first arc blade 11, which is located on the side facing the second jaw 30. Correspondingly, the second jaw 30 further includes a second arc blade 31, which is located on the side facing the first jaw body first jaw 10, so the first arc blade 11 and the second arc blade 31 are formed to be opposing each other. The structures of the first arc blade 11 and the second arc blade 31 can also be used to remove the head 82 of the cable tie 8, as shown in FIG. 6. FIG. 6 illustrates a schematic view of the cable tie removal tool shown in FIG. 2 for removing the head of the cable tie.

As shown in FIG. 6, after the cable tie removal tool 1 is opened (that is, in the fully open state), the first jaw 10 and the second jaw 30 are placed on the two sides of the bottom of the head 82. Next, the cable tie removal tool 1 is closed, so that the first arc blade 11 and the second arc blade 31 are brought close to each other to cut the band 81 connected to the head 82 (located on the bottom edge of the head 82), thereby removing the cable tie 8.

Figure 7:
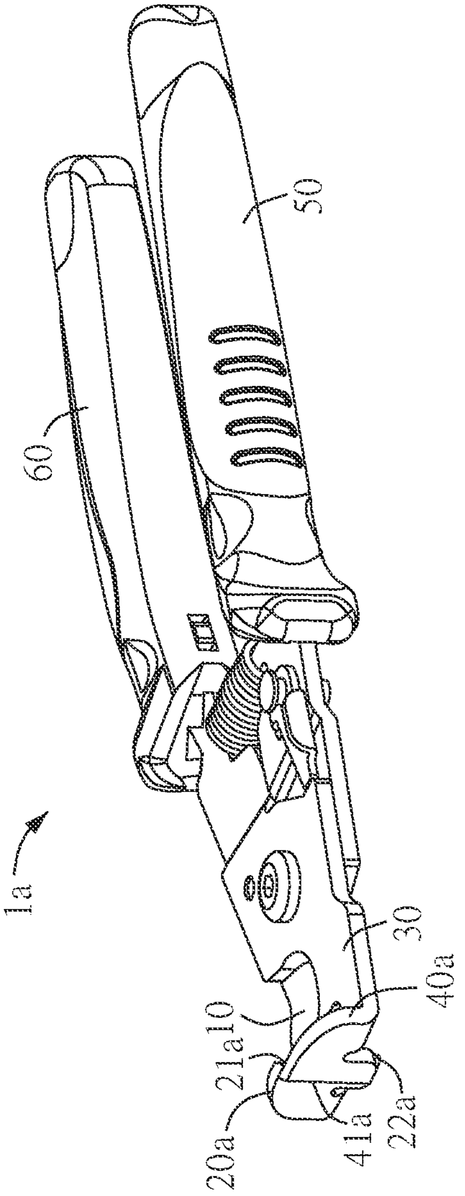
FIG. 7 illustrates a schematic view of a cable tie removal tool according to a second embodiment of the present disclosure.
Figure 8A:
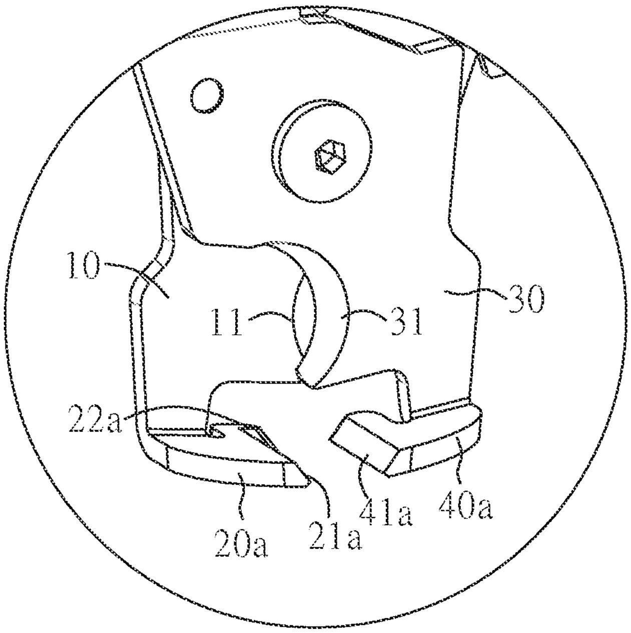
FIG. 8A illustrates a schematic view of the front end of the cable tie removal tool shown in FIG. 7 in a fully open state.
Figure 8B:
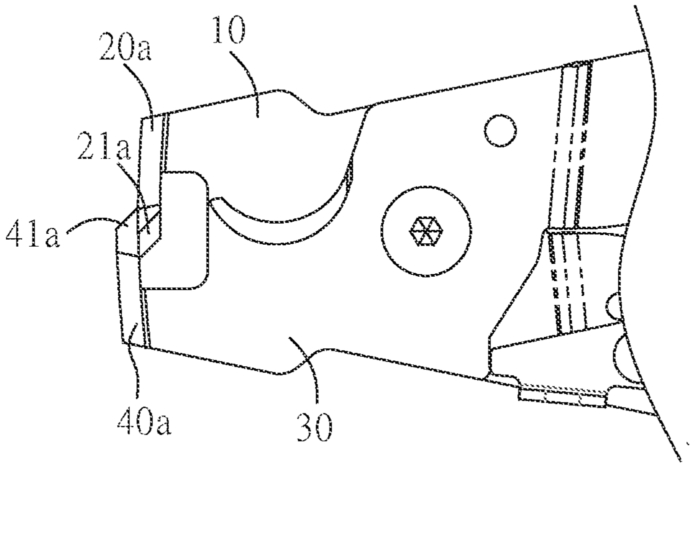
FIG. 8B illustrates a top view of the front end of the cable tie removal tool shown in FIG. 7.

FIG. 7 illustrates a schematic view of a cable tie removal tool according to a second embodiment of the present disclosure, FIG. 8A illustrates a schematic view of the front end of the cable tie removal tool shown in FIG. 7 in a fully open state, and FIG. 8B illustrates a top view of the front end of the cable tie removal tool shown in FIG. 7, please refer to FIG. 7, FIG. 8A, and FIG. 8B. The main difference between the cable tie removal tool 1*a* of the second embodiment and the cable tie removal tool 1 of the previous embodiment is that the first cutting member 20*a* and the second cutting member 40*a* of this embodiment are staggered with each other in the fully closed state. The structures and connection relationships of the first jaw 10, the second jaw 30, the first handle 50, and the second handle 60 are the same as those in the previous embodiment, so the same reference numerals are used.

Specifically, the first cutting member 20*a* is similarly connected to the front end of the first jaw body 10, and the second cutting member 40*a* is connected to the front end of the second jaw 30. Preferably, the first cutting member 20*a* is perpendicular to the first jaw 10, and the second cutting member 40*a* is also perpendicular to the second jaw 30. When the cable tie removal tool 1*a* of this embodiment is in the fully closed state, the first cutting member 20*a* is disposed on an inner side of the second cutting member 40*a*, which is the side close to the second jaw 30. By doing so, the first cutting member 20*a* and the second cutting member 40*a* are staggered with each other. In the fully closed state, the first cutting edge 21*a* is disposed adjacent to the second cutting edge 41*a*, and the first cutting edge 21*a* is located inside the second cutting edge 41*a*, as shown in FIG. 8B.

Because the first cutting member 20*a* and the first jaw 10 are plates located at different levels, and similarly, the second cutting member 40*a* and the second jaw 30 are plates located at different levels, the front end of the cable tie removal tool 1*a* is formed to have a gentle (non-sharp) structure, thereby achieving the effect of avoiding damaging the bundled object during operation as described in the previous embodiment.

As shown in FIG. 8A, the first jaw 10 also has a first arc blade 11, and the second jaw 30 has a second arc blade 31. Therefore, the cable tie removal tool 1*a* of this embodiment can also be applied to the head 82 of the cable tie 8 for removing the cable tie, as shown in FIG. 6. According to the requirements of the user, the cable tie removal tool 1*a* of this embodiment can use the first cutting edge 21 and the second cutting edge 41 to cut the band 81 of the cable tie 8, or alternatively use the first arc blade 11 and the second arc blade 31 to cut the head 82 of the cable tie 8, thereby achieving the effect of convenient operation.

Figure 9:
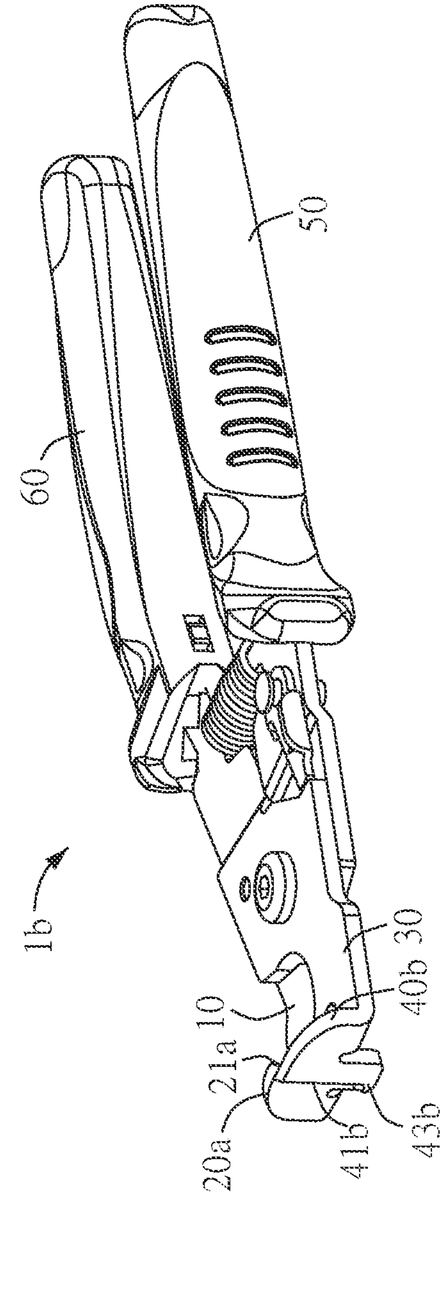
FIG. 9 illustrates a schematic view of a cable tie removal tool according to a third embodiment of the disclosure.
Figure 10:
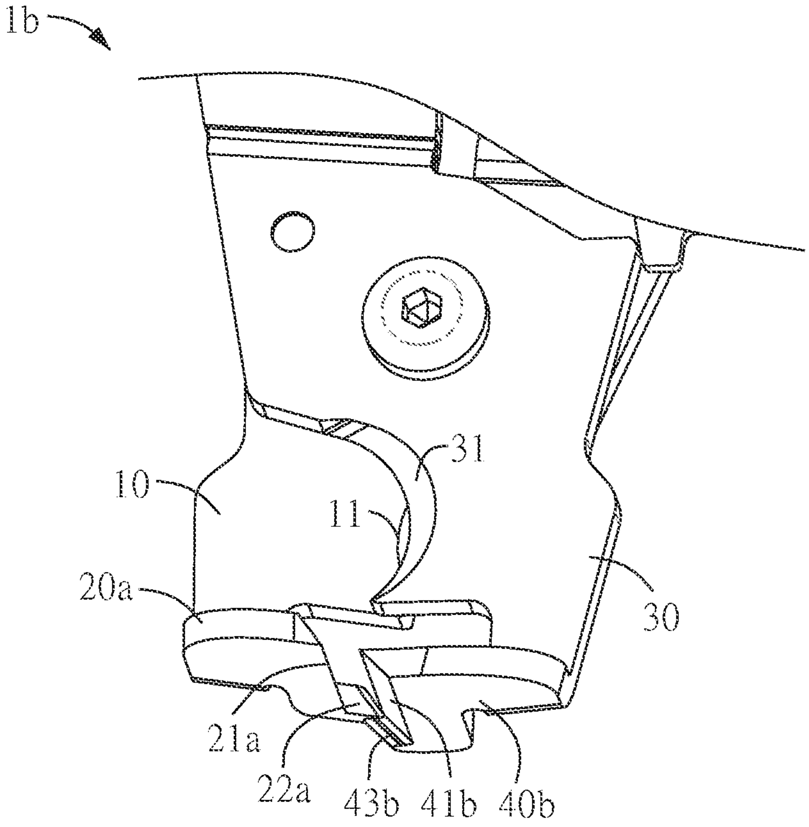
FIG. 10 illustrates a schematic view of the front end of the cable tie removal tool shown in FIG. 9 in a fully open state.

FIG. 9 illustrates a schematic view of a cable tie removal tool according to a third embodiment of the present disclosure, FIG. 10 illustrates a schematic view of the front end of the cable tie removal tool shown in FIG. 9 in a fully open state, please refer to FIG. 9 and FIG. 10. The main difference between the cable tie removal tool 1*b* of the third embodiment and the cable tie removal tool 1*a* of the second embodiment is that the second cutting member 40*b* further included a second convex portion 43*b*. Similar to the second embodiment, the first cutting member 20*a* and the second cutting member 40*b* of this embodiment are staggered with each other in the fully closed state. The structure and connection relationship of the first jaw 10, the first cutting member 20*a*, the second jaw 30, the first handle 50, and the second handle 60 are the same as those in the previous embodiment, so the same reference numerals are used.

Specifically, the second convex portion 43*b* of this embodiment is disposed at one end of the second cutting edge 41*b* close to the second jaw 30. That is, the second convex portion 43*b* is located at the bottom end of the second cutting edge 41*b*. Besides, the second convex portion 43*b* protrudes from the second cutting member 40*b* toward the direction of the first cutting member 20*a*. Therefore, the second convex portion 43*b* of the second cutting member 40*b* is disposed opposite to the first convex portion 22*a* of the first cutting member 20*a*. Because the first cutting member 20*a* and the second cutting member 40*b* of this embodiment are staggered with each other in the fully closed state, so that the first convex portion 22*a* and the second convex portion 43*b* do not block each other.

Both the first convex portion 22*a* and the second convex portion 43*b* can be used to lift up the band 81 (refer to FIG. 4) to make the band 81 and the bundled object (For example, the wire slightly separate from each other, thereby preventing the first cutting edge 21*a* and the second cutting edge

41*b* from being in contact with the bundled object to avoid damaging the bundled object.

Figure 11:
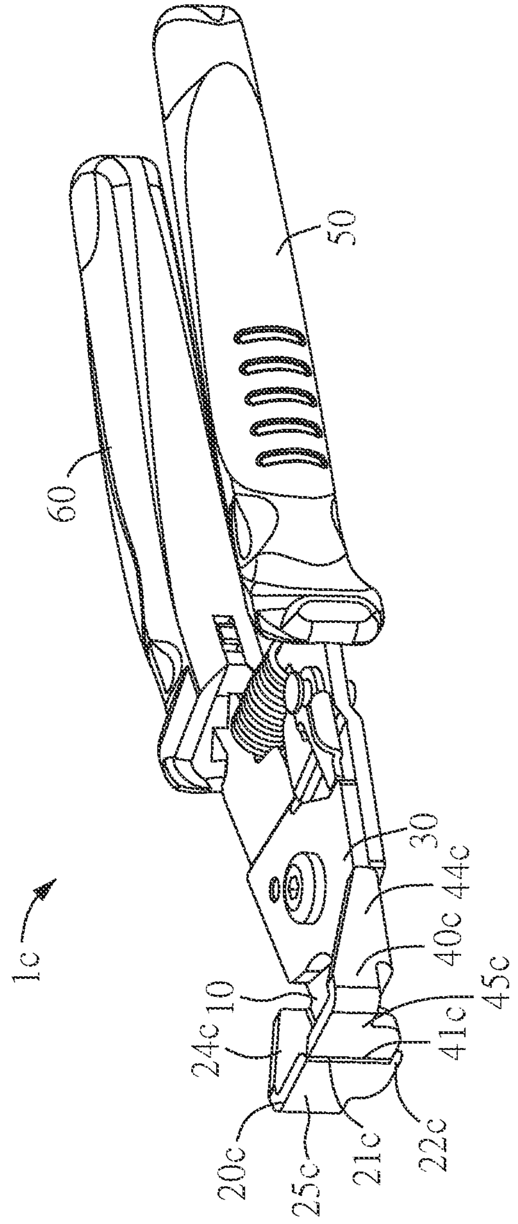
FIG. 11 illustrates a schematic view of a cable tie removal tool according to a fourth embodiment of the present disclosure.
Figure 12:
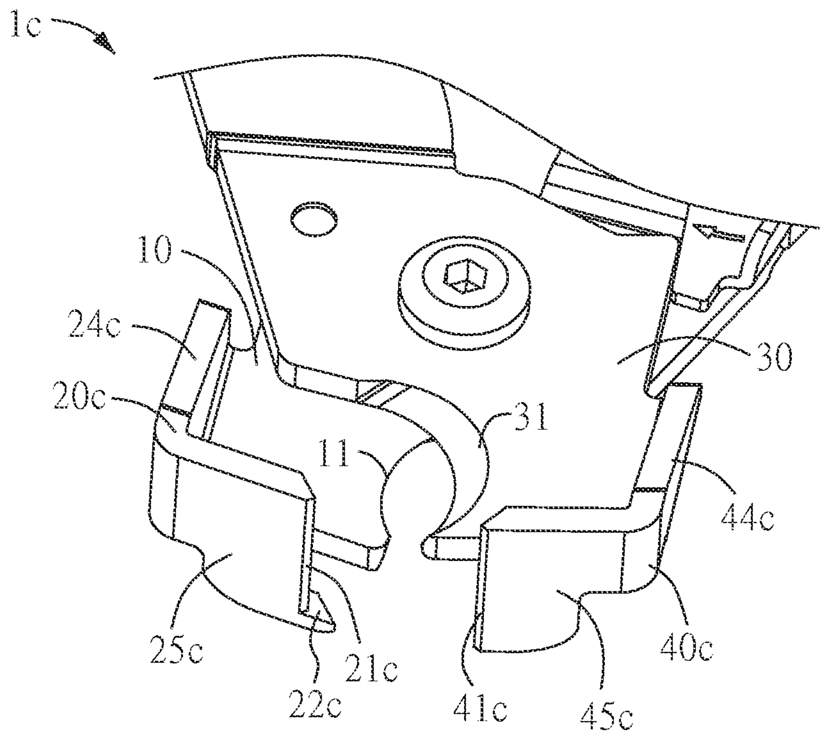
FIG. 12 illustrates a schematic view of the front end of the cable tie removal tool shown in FIG. 11 in a fully open state.

FIG. 11 illustrates a schematic view of a cable tie removal tool according to a fourth embodiment of the disclosure, and FIG. 12 illustrates a schematic view of the front end of the cable tie removal tool shown in FIG. 11 in a fully open state, please refer to FIG. 11 and FIG. 12. The structures and connection relationships of the first jaw 10, the second jaw 30, the first handle 50, and the second handle 60 of the cable tie removal tool 1*c* of the fourth embodiment are the same as those of the previous embodiment, so the same reference numerals are used. In addition, the main difference between the cable tie removal tool 1*c* of this embodiment and that of the previous embodiment is that the first cutting member 20*c* is connected to one side of the first jaw 10, and the second cutting member 40*c* is connected to one side of the second jaw 30. The side of the first jaw 10 refers to the outer side of the first jaw rather than the front end. Similarly, the side of the second jaw 30 refers to the outer side of the second jaw 30 rather than the front end.

Specifically, the first cutting member 20*c* includes a first portion 24*c* and a second portion 25*c*. The first portion 24*c* is connected to the outer side of the first jaw 20*c*, and the second portion 25*c* is parallel to the front end of the first jaw 10. Besides, the first cutting edge 21*c* is located on the side of the second portion 25*c* facing the second cutting member 40*c*. The first convex portion 22*c* protrudes from the bottom side of the second portion 25*c* toward the direction of the second cutting member 40*c*, and the first convex portion 22*c* is located at the bottom of the first cutting edge 21*c*. The first jaw 10 and the first cutting member 20*c* of this embodiment can be formed in one piece. For example, a plate is bent twice to form the first jaw 10, and the first portion 24*c* and the second portion 25*c* of the first cutting member 20*c*. Specifically, the first cutting member 20*c* extends upward from the side of the first jaw 10, and then bends in the direction of the front end of the first jaw 10 to form the first portion 24*c* and the second portion 25*c*. Besides, the first portion 24*c* is connected to the side of the first jaw 10, and the second portion 25*c* is located at the front end of the first jaw 10.

Correspondingly, the second cutting member 40*c* includes a third portion 44*c* and a fourth portion 45*c*. The third portion 44*c* is connected to the outer side of the second jaw 30, and the fourth portion 45*c* is parallel to the front end of the second jaw 30. Besides, the second cutting edge 41*c* is located on the side of the fourth portion 45*c* facing the first cutting member 20*c*. Likewise, the second jaw 30 and the second cutting member 40*c* may be formed in one piece. For example, a plate is bent twice to form the second jaw 30, and the third portion 44*c* and the fourth portion 45*c* of the second cutting member 40*c*. The second cutting member 40*c* extends upward from the side edge of the second jaw 30, and then bends in the direction of the front end of the second jaw 30 to form a third portion 44*c* and a fourth portion 45*c*.

With the aforementioned structure, the second portion 25*c* of the first cutting member 20*c* and the first jaw 10 have a (first) included angle formed therebetween, and the fourth portion 45*c* of the second cutting member 40*c* and the second jaw 30 have a (second) included angle formed therebetween. Therefore, the front end of the cable tie removal tool 1*c* still has a gentle (non-sharp) structure, which can achieve the same effect of avoiding damaging the bundled object during operation as described in the previous embodiment.

Preferably, when the cable tie removal tool 1*c* of this embodiment is in a fully closed state, the first cutting member 20*c* and the second cutting member 40*c* are aligned with each other, as shown in FIG. 11, so that the cable tie removal tool 1*c* of this embodiment is also suitable for removing the head 82 of the cable tie 8. As shown in FIG. 12, the first jaw 10 also has a first arc blade 11, and the second jaw 30 has a second arc blade 31. Therefore, the cable tie removal tool 1*c* of this embodiment can also be applied to remove the head 82 of the cable tie 8 by using the method shown in FIG. 6, thereby achieving the effect of convenient operation.

As described above, a cable tie removal tool according to the present disclosure includes a first jaw, a first cutting member, a second jaw, and a second cutting member. The first cutting member is connected to the first jaw, and is located at one end of the first jaw. The second cutting member is connected to the second jaw, and is located at one end of the second jaw. One side of the first cutting member has a first cutting edge, and one side of the second cutting member has a second cutting edge. In the fully closed state, the second cutting edge and the first cutting edge are disposed adjacent to each other. Since the first cutting member and the first jaw have a (first) included angle, and the second cutting member and the second jaw also have a (second) included angle, the front end of the cable tie removal tool is formed to have a gentle (not sharp) configuration. When the first cutting member and the second cutting member at the front end of the cable tie removal tool are heading toward the cable tie to be removed, the bundled object will not be damaged. In addition, the first cutting member further includes a first convex portion, which is disposed at an end of the first cutting edge close to the first jaw. During operation, the first convex portion can lift the cable tie, so that the cable tie and the bundled object are slightly separated, thereby preventing the first cutting edge and the second cutting edge from being in contact with the bundled object to avoid damaging the object.

In addition, by arranging the first cutting member to be perpendicular to the first jaw, and the second cutting member to be perpendicular to the second jaw (that is, the first included angle and the second included angle are 90 degrees, respectively), the cable tie removal tool of the present disclosure is more applicable to remove the head of the cable tie, thereby achieving the effect of convenient operation.

It is noted that the above-described embodiments are merely illustrative of preferred embodiments of the present disclosure, and that in order to prevent redundancy, not all possible combinations of the variations are described in detail; various changes and modifications may be made to the described embodiments without departing from the scope of the disclosure as described by the appended claims.

What is claimed is:

1. A cable tie removal tool having a fully closed state and a fully open state, the cable tie removal tool comprising:

a first jaw;

a first cutting member connected to the first jaw and located at one end of the first jaw, the first cutting member and the first jaw having a first included angle formed therebetween;

a second jaw pivotally connected to the first jaw; and a second cutting member connected to the second jaw and located at one end of the second jaw, the second cutting member and the second jaw having a second included angle formed therebetween, wherein the first cutting member and the second cutting member each comprise:

a short portion having a first end and a second end opposite to each other;

an elongated portion adjacent to the short portion, the elongated portion having a first end and a second end opposite to each other; wherein a distance measured between the first end and the second end of the short portion is shorter than a distance measured between the first end and the second end of the elongated portion;

a free end formed by the first end of the short portion and the first end of the elongated portion; and a connecting end formed by the second end of the short portion, wherein the second end of the elongated portion extends toward the connecting end and protrudes outwardly from the connecting end;

wherein the first cutting member has a cutting edge located at a side of the elongated portion of the first cutting member that faces away from the short portion of the first cutting member, and a convex portion disposed at the side of the elongated portion of the first cutting member that faces away from the short portion of the first cutting member, the convex portion and the free end of the first cutting member positioned at two opposite ends of the cutting edge of the first cutting member; and wherein the second cutting member has a second cutting edge located at a side of the elongated portion of the second cutting member that faces away from the short portion of the second cutting member; and wherein, in the fully closed state, the cutting edge of the first cutting member is engaged with the cutting edge of the second cutting member, wherein, in the fully open state, the cutting edge of the first cutting member is spaced apart from the cutting edge of the second cutting member; and wherein the convex portion of the first cutting member protrudes from the first cutting member toward a direction of the second cutting member in the fully closed state and the convex portion of the first cutting member is located outside the second end of the elongated portion of the second cutting member.

2. The cable tie removal tool as claimed in claim 1, wherein the first included angle and the second included angle are respectively 90 degrees.

3. The cable tie removal tool as claimed in claim 1, wherein the first cutting member is connected to a front end of the first jaw, and the second cutting member is connected to a front end of the second jaw.

4. The cable tie removal tool as claimed in claim 1, wherein the first jaw further comprises a first arc blade facing the second jaw, the second jaw further comprises a second arc blade facing the first jaw.

5. The cable tie removal tool as claimed in claim 1, wherein a front side surface of the first cutting member defines a plane perpendicular to the first jaw and a front side surface of the second cutting member defines a plane perpendicular to the second jaw.

6. The cable tie removal tool as claimed in claim 1 further comprising:

a first handle being connected to the first jaw and located at one end opposite to the first cutting member; and a second handle being connected to the second jaw and located at one end opposite to the second cutting member.

* * * * *